US011937046B2

(12) United States Patent
Ioku et al.

(10) Patent No.: US 11,937,046 B2
(45) Date of Patent: Mar. 19, 2024

(54) SOUND DIFFUSER AND DIFFUSION METHOD

(71) Applicant: Yamaha Corporation, Shizuoka (JP)

(72) Inventors: Kenta Ioku, Shizuoka (JP); Masumi Adachi, Shizuoka (JP)

(73) Assignee: YAMAHA CORPORATION, Shizuoka (JP)

( * ) Notice: Subject to any disclaimer, the term of this patent is extended or adjusted under 35 U.S.C. 154(b) by 0 days.

(21) Appl. No.: 17/590,706

(22) Filed: Feb. 1, 2022

(65) Prior Publication Data

US 2022/0248129 A1 Aug. 4, 2022

(30) Foreign Application Priority Data

Feb. 2, 2021 (JP) .................................. 2021-14809

(51) Int. Cl.

*H04R 1/34* (2006.01)
*G10K 11/26* (2006.01)
*H04R 1/32* (2006.01)
*G10K 11/20* (2006.01)

(52) U.S. Cl.

CPC ............. *H04R 1/345* (2013.01); *G10K 11/26* (2013.01); *G10K 11/20* (2013.01)

(58) Field of Classification Search

CPC . H04R 1/34; H04R 1/345; H04R 1/32; H04R 1/323; H04R 1/023; G10K 11/26; G10K 11/20; G10K 11/18; G10K 11/28

See application file for complete search history.

(56) References Cited

U.S. PATENT DOCUMENTS 2,001,089 A * 5/1935 Blattner ................. H04R 1/345 181/187
2,033,337 A * 3/1936 Harmer .................. G10K 11/28 181/177
2,167,625 A * 8/1939 Albano .................. H04R 1/345 181/156
2,203,875 A * 6/1940 Olson .................. G10K 11/025 181/187

(Continued)

FOREIGN PATENT DOCUMENTS

CN 215345058 U * 12/2021
DE 202006015232 U1 * 2/2007 .......... F21V 33/0056

(Continued)

*Primary Examiner* — Edgardo San Martin
(74) *Attorney, Agent, or Firm* — Global IP Counselors, LLP

(57) ABSTRACT

A sound diffuser includes a first annular control member, a second annular control member, and a third annular control member. The first annular control member includes a first communication hole and an annular inclined plate that surrounds the first communication hole and is inclined relative to an axial direction of the first communication hole. The second annular control member includes a second communication hole and an annular inclined plate that surrounds the second communication hole, houses the first annular control member therein, and is inclined relative to an axial direction of the second communication hole. The third annular control member has a plurality of third communication holes and surrounds the second annular control member.

21 Claims, 4 Drawing Sheets

(56) References Cited

U.S. PATENT DOCUMENTS

| | | | | | |
|---|---|---|---|---|---|
| 2,541,946 | A * | 2/1951 | Stark | H04R 1/345 | 181/187 |
| 2,819,773 | A * | 1/1958 | Lowell | H04R 1/345 | 181/175 |
| 3,136,382 | A * | 6/1964 | Thaler | H04R 1/227 | 381/186 |
| 3,719,250 | A * | 3/1973 | Maekawa | H04R 1/02 | 181/153 |
| 4,836,327 | A * | 6/1989 | Andrews | H04R 1/30 | 181/154 |
| 6,389,144 | B1 * | 5/2002 | Lee | H04R 5/02 | 381/337 |
| 7,324,656 | B2 * | 1/2008 | Iwayama | H04R 1/345 | 381/189 |
| 9,936,281 | B2 * | 4/2018 | Tamura | H04R 1/1066 | |
| 11,277,684 | B2 * | 3/2022 | Kitagawa | H04R 1/345 | |

FOREIGN PATENT DOCUMENTS

| | | | | |
|---|---|---|---|---|
| EP | 1509063 | A1 * | 2/2005 | H04N 5/642 |
| JP | 3818959 | B2 | 9/2006 | |
| JP | 2021093580 | A * | 6/2021 | |
| WO | WO-2019234485 | A1 * | 12/2019 | |

* cited by examiner

SOUND DIFFUSER AND DIFFUSION METHOD

CROSS-REFERENCE TO RELATED APPLICATIONS

This application claims priority to Japanese Patent Application No. 2021-14809, filed on Feb. 2, 2021. The entire disclosure of Japanese Patent Application No. 2021-14809 is hereby incorporated herein by reference.

BACKGROUND

Technical Field

The present invention relates to a sound diffuser and to a diffusion method for expanding the directivity of a loudspeaker system.

Background Information

U.S. Pat. No. 3,818,959 discloses a technology for expanding the directivity of a loudspeaker system. In the technology disclosed in U.S. Pat. No. 3,818,959, sound from the loudspeaker unit is collected and narrowed down in a small hole, and a drop-shaped diffuser (diffuser) provided in the hole diffuses the sound, thereby expanding the directivity.

SUMMARY

In the technology disclosed in U.S. Pat. No. 3,818,959, since sound is effectively narrowed down, a grill with numerous holes is not provided around the narrowing hole. When such a technology is applied to a full-range speaker, air can become trapped in the space between the diffuser and the loudspeaker unit and distort the loudspeaker unit, thereby distorting the sound.

In consideration of the circumstance described above, an object of this disclosure is to provide a technical means that is capable of expanding the directivity without distorting the sound even when applied to a full-range loudspeaker.

This disclosure provides a sound diffuser comprising a first annular control member including a first communication hole and an annular inclined plate that surrounds the first communication hole and is inclined relative to an axial direction of the first communication hole, a second annular control member including a second communication hole and an annular inclined plate that surrounds the second communication hole, houses the first annular control member therein, and is inclined relative to an axial direction of the second communication hole, and a third annular control member that has a plurality of third communication holes and surrounds the second annular control member.

DETAILED DESCRIPTION OF THE EMBODIMENTS

Selected embodiments will now be explained in detail below, with reference to the drawings as appropriate. It will be apparent to those skilled from this disclosure that the following descriptions of the embodiments are provided for illustration only and not for the purpose of limiting the invention as defined by the appended claims and their equivalents.

Figure 1:
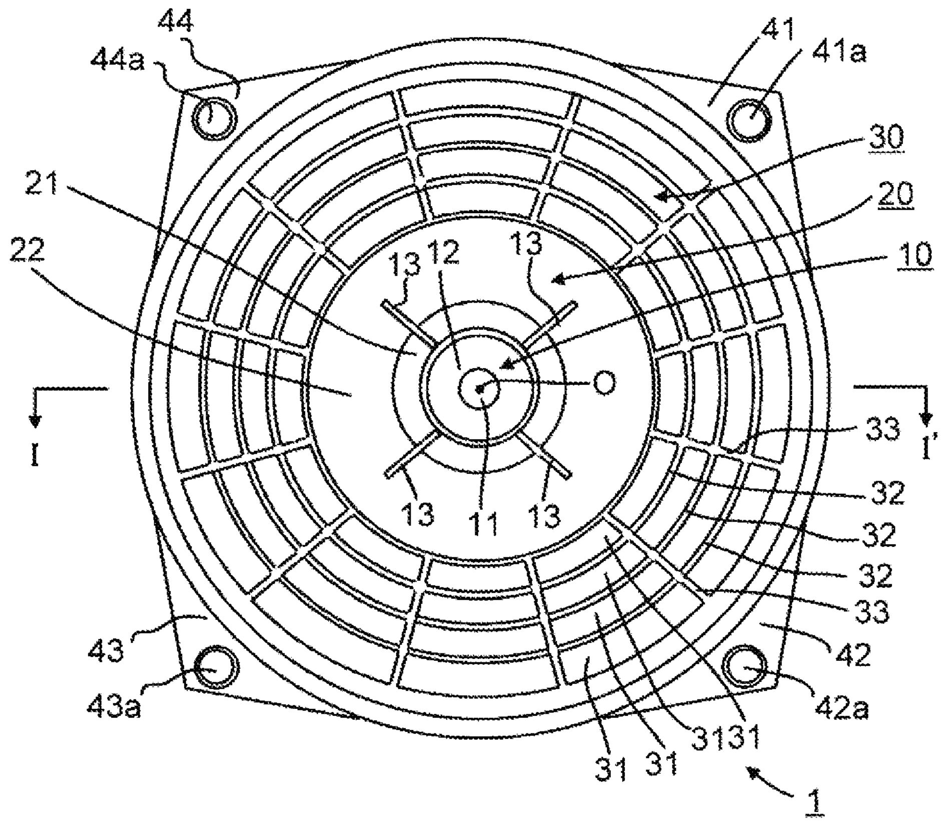
FIG. 1 is a plan view showing a configuration of a diffuser in one embodiment of a sound diffuser according to this disclosure.
Figure 2:
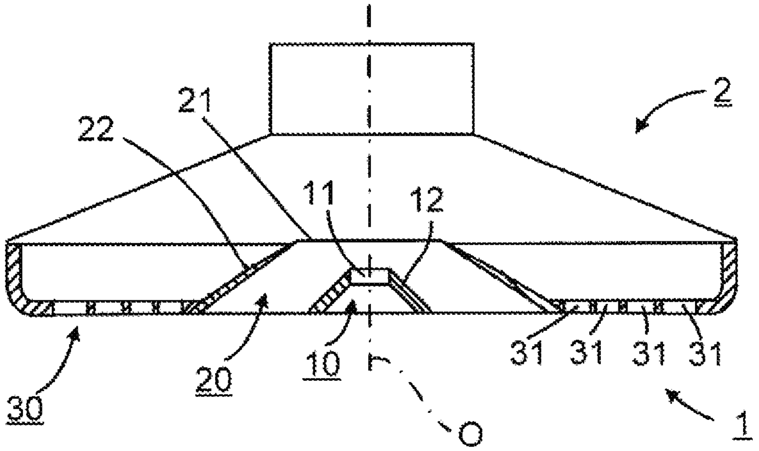
FIG. 2 shows a cross section through line I-I' in FIG. 1.

FIG. 1 is a plan view showing the configuration of a diffuser 1 in one embodiment of a sound diffuser according to this disclosure. FIG. 2 shows a cross section through line I-I' in FIG. 1. In FIG. 2, a loudspeaker unit (loudspeaker) 2 is shown together with the diffuser 1 to facilitate understanding of the usage of the diffuser 1.

As shown in FIGS. 1 and 2, the diffuser 1 has a first annular control member (first annular control unit) 10, a second annular control member (second annular control unit) 20, a third annular control member 30 (third annular control unit), and support portions 41-44.

The first annular control member 10 is a funnel-shaped component with a first communication hole 11 open at the center. The first annular control member 10 has the first communication hole 11 and an annular inclined plate 12 that surrounds this first communication hole 11 and that is inclined relative to the axial direction of the first communication hole 11. In a state in which the diffuser 1 is attached to the loudspeaker unit 2, the axis of the first communication hole 11 coincides with the central axis O of the loudspeaker unit 2.

The second annular control member 20 is a funnel-shaped component with a second communication hole 21, which is coaxial with the first communication hole 11, open at the center. The second annular control member 20 has the second communication hole 21 and an annular inclined plate 22 that surrounds this second communication hole 21, houses the first annular control member 10 therein, and is inclined relative to the axial direction of the second communication hole 21.

In the example shown, the inclined plate 12 of the first annular control member 10 is connected to the inclined plate 22 of the second annular control member 20 via at least one (four in FIG. 1) support plates 13 that extend radially from the inclined plate 12, and is supported by the inclined plate 22.

In the present embodiment, as shown in FIG. 2, the cross-sectional area of the space between the inclined plate 12 of the first annular control member 10 and the inclined plate 22 of the second annular control member 20 increases as the distance from the axis of the second communication hole 21, that is, from the axis of the first communication hole 11, the axis of the second communication hole 21, and the central axis O of the loudspeaker unit 2 in the embodiment, increases.

In addition, in the present embodiment, as shown in FIG. 2, in the second annular control element 20, the thickness of the inclined plate 22 increases as the distance from the axis of the second communication hole 21, that is, from the axis of the first communication hole 11, the axis of the second communication hole 21, and the central axis O of the loudspeaker unit 2 in the embodiment, increases.

The third annular control member 30 corresponds to a grill, has a plurality of third communication holes 31, and surrounds the second annular control member 20. In the example shown, the third annular control member 30 includes a plurality of concentric crosspiece elements 32 and a plurality of ribs 33 that extend radially outwardly from the center of the diffuser 1, and the plurality of third communication holes 31 are essentially rectangular communication holes surrounded by the crosspiece elements 32 and the ribs 33. Thus, as shown in FIGS. 1 and 2, the third annular control member 30 has the third communication holes 31 at an area that does not overlap with the inclined plate 22 of the second annular control member 20 as viewed in the axial direction of the second communication hole 21.

The support portions 41-44 are provided at four locations in the corners of the diffuser 1. Through-holes 41*a*-44*a* are open in the support portions 41-44. Screws are inserted in the through-holes 41*a*-44*a* and threaded into female screw holes provided on a baffle plate (not shown), to which the loudspeaker unit 2 is attached, thereby fixing the diffuser 1 to the loudspeaker unit 2.

In the present embodiment, while sound emitted from the loudspeaker unit 2 passes through the first communication hole 11 of the first annular control member 10 of the diffuser 1 and advances, the sound is guided to and advances in the space between the inclined plate 12 of the first annular control member 10 and the inclined plate 22 of the second annular control member 20. Accordingly, its directivity is expanded, and the sound is emitted from the diffuser 1 to the outside. In addition, the sound emitted from the loudspeaker unit 2 passes through the plurality of third communication holes 31 provided in the third annular control member 30 and is emitted from the diffuser 1 to the outside.

In the present embodiment, sound is not narrowed down as in the technology of the above-described U.S. Pat. No. 3,818,959, rather the directivity is expanded by causing the sound to propagate along the surfaces of the inclined plates 12 and 22. Therefore, in the present embodiment, the directivity can be widened without distorting the sound, even when the diffuser 1 is applied to a full-range loudspeaker.

In addition, by this disclosure, the cross-sectional area of the space between the inclined plate 12 of the first annular control member 10 and the inclined plate 22 of the second annular control member 20 increases as the distance from the central axis O increases; thus, sound can easily pass through the space between the inclined plates 12 and 22, thereby enhancing the effect of widening the directivity.

In addition, by the present embodiment, increasing the thickness of the inclined plate 22 of the second annular control element 20 as increasing a distance from the central axis O of the loudspeaker unit 2 produces the following effects. First, since a portion of the inclined plate 22, which is closer to the central axis O, is thinner, the sound emitted from the loudspeaker unit 2 can be easily guided to the space between the inclined plates 12 and 22. Moreover, since a portion of the inclined plate 22, which is more apart from the central axis O, is thicker, the mechanical strength of the inclined plate 22 that supports the inclined plate 12 is high.

Figure 3:
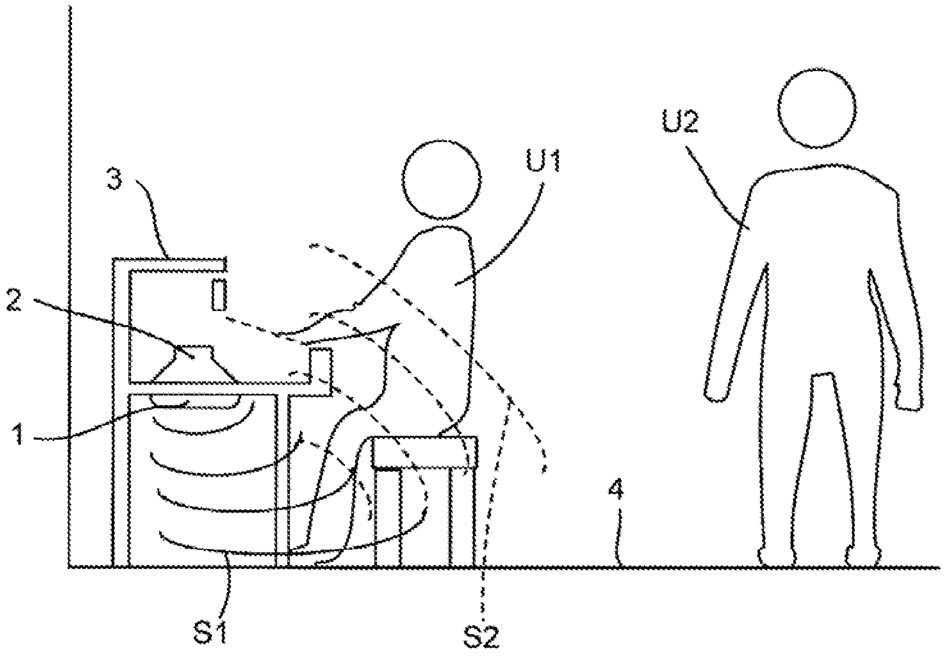
FIG. 3 is a diagram showing an application example of the embodiment.

FIG. 3 is a diagram showing an application example of the present embodiment. In the application example, the loudspeaker unit 2 is disposed on an upper surface of a key bed that supports the keys of an electronic keyboard instrument 3 that has been placed on a floor 4. The sound-emitting surface of the loudspeaker unit 2 faces downward, and the diffuser 1 covers the sound-emitting surface of the loudspeaker unit 2. When a performer U1 sitting in a seat in front of the electronic keyboard instrument 3 plays the electronic keyboard instrument 3, the loudspeaker unit 2 emits sound downwards in accordance with the performance. In addition, in this application example, a listener U2 standing behind and away from the performer U1 listens to the keyboard performance of the performer U1.

In FIG. 3, the sound heard by the performer U1 is emitted by the loudspeaker unit 2, is reflected from the floor 4, reaches the performer U1, and becomes predominant. If the diffuser 1 is not provided, the sound reflected from the floor 4 will have narrow directivity, creating the problem that dips in the peaks of the frequency characteristics of the sound heard by the performer U1 due to interference by a structure (for example, the floor 4 or the electronic keyboard instrument 3) tend to occur. In addition, there is a problem that, in particular, it is difficult for high-frequency sounds of the performance sound emitted by the loudspeaker unit 2 to reach the listener U2 who is distant from the loudspeaker unit 2.

However, in the application example, the sound-emitting surface of the loudspeaker unit 2 is covered by the diffuser 1. Thus, the sound emitted from the loudspeaker unit 2 passes through the diffuser 1, becomes sound S1 with wide directivity, and is directed toward the floor 4. The sound S1 is reflected from the floor 4 as sound S2 with wide directivity, and is emitted into a spatial region that includes the entire body of the performer U1. The problems described above are thereby resolved.

By experimentation, the present inventors were able to confirm that by providing the diffuser 1 on the front surface of the loudspeaker unit 2, the directivity of the sound emitted from the loudspeaker unit 2 is expanded. Specifically, the sound pressure in the direction of 90 degrees with respect to the drive axis direction of the loudspeaker unit 2 increased from −12 dB to 0 dB at 1 kHz, and increased from −20 dB to −5 dB at 2 kHz. In addition, the sound pressure in the direction of +45 degrees with respect to the drive axis direction of the loudspeaker unit 2 increased from −30 dB to −2 dB at 2 kHz and increased from −30 dB to −9 dB at 4 kHz. Also, it was confirmed that the frequency characteristics of the sound heard by the performer U1 when the diffuser 1 is not provided showed a large dip at 3 kHz, but the large dip at 3 kHz was lessened when the diffuser 1 is provided. It also was confirmed that when the diffuser 1 is not provided, the frequency characteristics of the sound heard by the listener U2 showed a large dip at 3 kHz, but the large dip at 3 kHz was lessened when the diffuser 1 is provided.

Other Embodiments

One embodiment of this disclosure was described above, but other embodiments of this disclosure are conceivable. The following are examples.

(1) In the above-described embodiment, funnel-shaped inclined plates are employed as the annular inclined plates 12 and 22, but inclined plates having a conical frustum-shaped surface can be employed instead.

(2) In the above-described embodiment, the two inclined plates are inclined such that the cross-sectional area of the space on the inner side of the inclined plate 12 of the first annular control member 10 and the cross-sectional area of the space on the inner side of the inclined plate 22 of the second annular control member 20 increase in the direction in which sound is emitted from the loudspeaker unit 2. However, the two inclined plates can be inclined such that the cross-sectional area of the space on the inner side of the inclined plate 12 of the first annular control member 10 and the cross-sectional area of the space on the inner side of the inclined plate 22 of the second annular control member 20 decrease in the direction in which sound is emitted from the loudspeaker unit 2.

(3) In the above-described embodiment, the two inclined plates formed of the inclined plate 12 of the first annular control member 10 and the inclined plate 22 of the second annular control member 20 are provided in the diffuser 1, but a greater number of inclined plates can be provided in the diffuser 1.

Figure 4:
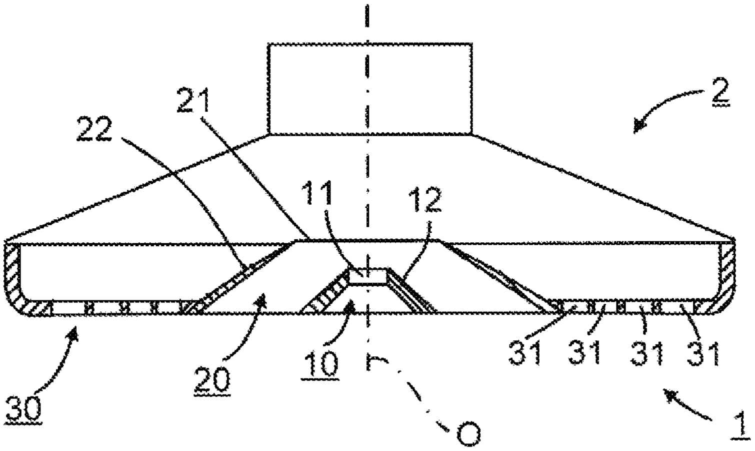
FIG. 4 shows a cross section through line I-I' in FIG. 1 according to another embodiment.

(4) The first annular control member 10 can also be configured such that the thickness of the inclined plate 12 increases in the direction in which sound is emitted from the loudspeaker unit 2. As shown in FIG. 4, the thickness of the inclined plate 12 increases as the distance from the axis of the first communication hole 11 increases. Here, the thicker portion is supported by the support plate 13. As a result, the mechanical strength of the first annular control member 10 and the support plate 13 is increased.

(5) The degree of inclination of the inclined plate 22 of the second annular control member 20 can be made larger than the degree of inclination of the inclined plate 12 of the first annular control member 10, relative to the sound emission direction of the diffuser 1, i.e., in the direction of the central axis O of the loudspeaker unit 2. In this case, since the cross-sectional area of the space between the inclined plate 12 of the first annular control member 10 and the inclined plate 22 of the second annular control member 20 increases in the sound emission direction, sound can easily pass therethrough, thereby enhancing the effect of widening the directivity.

(6) The four support plates 13 that support the first annular control member 10 are supported by the second annular control member 20, but these plates can be supported by the third annular control member 30. In this case, the support plates 13 are supported by the crosspiece elements 32, the ribs 33, or both, which constitute the third annular control member 30.

(7) In the above-described embodiment, the drive axis of the loudspeaker unit 2, the axis of the first communication hole 11, and the axis of the second communication hole 21 are coaxial. However, from the standpoint of directivity control, the three axes need not be coaxial. For example, a configuration in which the axis of the first communication hole 11 is at an angle with respect to the drive axis of the loudspeaker unit 2, for example, a configuration in which the axis of the first communication hole 11 is tilted toward the legs of the performer U1 of FIG. 3, is possible. It is expected that the directivity will thereby be further expanded.

(8) In the above-described embodiment, this disclosure is implemented as a diffuser 1 in which the first annular control member 10, the second annular control member 20, and the third annular control member 30 are integrated. But the embodiment of this disclosure is not limited thereto. This disclosure can also be implemented as a sound diffusion method that comprises arranging a first annular control member 10 including a first communication hole and an annular inclined plate that surrounds the first communication hole and is inclined relative to an axial direction of the first communication hole, a second annular control member 20 including a second communication hole and an annular inclined plate that surrounds the second communication hole, houses the first annular control member 10 therein, and is inclined relative to an axial direction of the second communication hole, and a third annular control member 30 that has a plurality of third communication holes and surrounds the second annular control member 20, on a front surface of a sound-emitting surface of a loudspeaker unit, and expanding the directivity of the sound emitted from the loudspeaker unit.

What is claimed is:

1. A sound diffuser comprising:

a first annular control member including a first communication hole and an annular inclined plate that surrounds the first communication hole and is inclined relative to an axial direction of the first communication hole;

a second annular control member including a second communication hole and an annular inclined plate that surrounds the second communication hole, houses the first annular control member therein, and is inclined relative to an axial direction of the second communication hole; and a third annular control member that has a plurality of third communication holes and surrounds the second annular control member, an outer end of the annular inclined plate of the second annular control member and an outer surface of the third annular control member lying on a same plane, the plurality of third communication holes including at least one communication hole and an adjacent communication hole that are arranged so as to be adjacent to each other in a radial direction relative to the axial direction of the second communication hole, the one communication hole being closer to the second annular control member than the adjacent communication hole in the radial direction, a length in the radial direction of the one communication hole being smaller than a length in the radial direction of the adjacent communication hole.

2. The sound diffuser according to claim 1, wherein the second communication hole is coaxial with the first communication hole.

3. The sound diffuser according to claim 1, wherein a cross-sectional area of a space between the annular inclined plate of the first communication hole and the annular inclined plate of the second annular control member increases as a distance from the axis of the second communication hole increases.

4. The sound diffuser according to claim 1, wherein a thickness of the annular inclined plate of the second annular control member increases as a distance from the axis of the second communication hole increases.

5. The sound diffuser according to claim 1, wherein a thickness of the annular inclined plate of the first annular control member increases as a distance from the axis of the first communication hole increases.

6. The sound diffuser according to claim 1, wherein a degree of inclination of the annular inclined plate of the second annular control member is greater than a degree of inclination of the annular inclined plate of the first annular control member, relative to a sound emission direction of the sound diffuser.

7. The sound diffuser according to claim 2, wherein a cross-sectional area of a space between the annular inclined plate of the first communication hole and the annular inclined plate of the second annular control member increases as a distance from the axis of the second communication hole increases.

8. The sound diffuser according to claim 2, wherein a thickness of the annular inclined plate of the second annular control member increases as a distance from the axis of the second communication hole increases.

9. The sound diffuser according to claim 3, wherein a thickness of the annular inclined plate of the second annular control member increases as a distance from the axis of the second communication hole increases.

10. The sound diffuser according to claim 2, wherein a thickness of the annular inclined plate of the first annular control member increases as a distance from the axis of the first communication hole increases.

11. The sound diffuser according to claim 3, wherein a thickness of the annular inclined plate of the first annular control member increases as a distance from the axis of the first communication hole increases.

12. The sound diffuser according to claim 4, wherein a thickness of the annular inclined plate of the first annular control member increases as a distance from the axis of the first communication hole increases.

13. The sound diffuser according to claim 2, wherein a degree of inclination of the annular inclined plate of the second annular control member is greater than a degree of inclination of the annular inclined plate of the first annular control member, relative to a sound emission direction of the sound diffuser.

14. The sound diffuser according to claim 3, wherein a degree of inclination of the annular inclined plate of the second annular control member is greater than a degree of inclination of the annular inclined plate of the first annular control member, relative to a sound emission direction of the sound diffuser.

15. The sound diffuser according to claim 4, wherein a degree of inclination of the annular inclined plate of the second annular control member is greater than a degree of inclination of the annular inclined plate of the first annular control member, relative to a sound emission direction of the sound diffuser.

16. The sound diffuser according to claim 5, wherein a degree of inclination of the annular inclined plate of the second annular control member is greater than a degree of inclination of the annular inclined plate of the first annular control member, relative to a sound emission direction of the sound diffuser.

17. The sound diffuser according to claim 1, further comprising at least one support plate that extends radially between the annular inclined plate of the first annular control member and the annular inclined plate of the second annular control member to connect the first annular control member to the second annular control member.

18. The sound diffuser according to claim 1, wherein the third annular control member forms a speaker grill.

19. The sound diffuser according to claim 18, wherein the third annular control member has the third communication holes at an area that does not overlap with the annular inclined plate of the second annular control member as viewed in the axial direction of the second communication hole.

20. A sound diffusion method comprising:

arranging, on a front surface of a sound-emitting surface of a loudspeaker unit, a first annular control member including a first communication hole and an annular inclined plate that surrounds the first communication hole and is inclined relative to an axial direction of the first communication hole, a second annular control member including a second communication hole and an annular inclined plate that surrounds the second communication hole, houses the first annular control member therein, and is inclined relative to an axial direction of the second communication hole, and a third annular control member that has a plurality of third communication holes and surrounds the second annular control member, the plurality of third communication holes including at least one communication hole and an adjacent communication hole that are arranged so as to be adjacent to each other in a radial direction relative to the axial direction of the second communication hole, the one communication hole being closer to the second annular control member than the adjacent communication hole in the radial direction, a length in the radial direction of the one communication hole being smaller than a length in the radial direction of the adjacent communication hole, thereby expanding directivity of sound emitted from the loudspeaker unit, the arranging being performed such that an outer end of the annular inclined plate of the second annular control member and an outer surface of the third annular control member lie on a same plane.

21. The sound diffuser according to claim 1, wherein an outer end of the annular inclined plate of the first annular control member lies on the same plane on which the outer end of the annular inclined plate of the second annular control member and the outer surface of the third annular control member lie.

* * * * *